(12) United States Patent
Xia

(10) Patent No.: US 10,264,549 B2
(45) Date of Patent: Apr. 16, 2019

(54) METHOD FOR INDICATING CELL COVERAGE ENHANCEMENT MODE AND BASE STATION

(71) Applicant: Huawei Technologies Co., Ltd., Shenzhen (CN)

(72) Inventor: Jinhuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 257 days.

(21) Appl. No.: 15/223,260

(22) Filed: Jul. 29, 2016

(65) Prior Publication Data
US 2016/0338008 A1 Nov. 17, 2016

Related U.S. Application Data

(63) Continuation of application No. PCT/CN2014/071804, filed on Jan. 29, 2014.

(51) Int. Cl.
*H04W 68/02* (2009.01)
*H04W 48/10* (2009.01)
(Continued)

(52) U.S. Cl.
CPC .............. *H04W 68/02* (2013.01); *H04L 69/28* (2013.01); *H04W 16/26* (2013.01); *H04W 48/10* (2013.01);
(Continued)

(58) Field of Classification Search
None
See application file for complete search history.

(56) References Cited

U.S. PATENT DOCUMENTS

2011/0105155 A1\* 5/2011 Bienas ................ H04W 68/02
455/458
2011/0222491 A1 9/2011 Vajapeyam et al.
(Continued)

FOREIGN PATENT DOCUMENTS

CN 101374258 A 2/2009
CN 101754344 A 6/2010
(Continued)

OTHER PUBLICATIONS

Catt, "Impact Analysis of Extended Coverage"; 3GPP TSG RAN WG2 Meeting #85; Prague, Czech; Feb. 10-14, 2014; R2-140043; 7.9.2; 6 pages.
(Continued)

*Primary Examiner* — Lonnie V Sweet
(74) *Attorney, Agent, or Firm* — Slater Matsil, LLP

(57) ABSTRACT

A transmitter, configured to send system information to a terminal, where the system information is used for indicating to the terminal whether a cell covered by the base station supports coverage enhancement, and the system information includes a master information block MIB and/or a system information block SIB. According to the base station provided in an embodiment of the present invention, a transmitter sends, to a terminal, system information used for indicating whether a cell covered by the base station supports coverage enhancement, so that the terminal can accurately learn whether the cell supports communication in a coverage enhancement mode, and the terminal is notified in a timely manner when the cell does not support communication in the coverage enhancement mode, which avoids blind access of the terminal and reduces power consumption of the terminal.

12 Claims, 1 Drawing Sheet

A base station negotiates with a terminal about at least one second period for sending second system information — S201

The base station sends, on a second time-frequency resource within at least one second period, the second system information to the terminal, so that the terminal learns, according to the second system information, that a cell covered by the base station supports coverage enhancement — S202

(51) Int. Cl.
*H04W 16/26* (2009.01)
*H04W 88/02* (2009.01)
*H04W 88/08* (2009.01)
*H04L 29/06* (2006.01)

(52) U.S. Cl.
CPC ............ *H04W 88/02* (2013.01); *H04W 88/08* (2013.01); *Y02D 70/00* (2018.01); *Y02D 70/1222* (2018.01); *Y02D 70/1262* (2018.01); *Y02D 70/142* (2018.01)

(56) References Cited

U.S. PATENT DOCUMENTS

| | | | |
|---|---|---|---|
| 2012/0142352 A1 | 6/2012 | Zhang et al. | |
| 2014/0098761 A1* | 4/2014 | Lee | H04W 74/006 370/329 |
| 2015/0009005 A1 | 1/2015 | Sales Casals et al. | |
| 2015/0009883 A1 | 1/2015 | Bai et al. | |
| 2015/0017977 A1* | 1/2015 | Ratasuk | H04W 88/10 455/426.1 |
| 2015/0257173 A1* | 9/2015 | You | H04L 1/1864 370/330 |

FOREIGN PATENT DOCUMENTS

| | | |
|---|---|---|
| CN | 102447529 A | 5/2012 |
| CN | 102498655 A | 6/2012 |
| CN | 103229558 A | 7/2013 |
| CN | 103298090 A | 9/2013 |
| CN | 103378936 A | 10/2013 |
| EP | 2545739 A1 | 1/2013 |

OTHER PUBLICATIONS

Sony, "Enhanced Coverage Mobility Issues"; 3GPP TSG RAN WG2 Meeting #84; San Francisco, California, USA; Nov. 11-15, 2013; R2-133821; 7.9.2; 4 pages.

Huawei, HiSilicon, "SIB in enhanced coverage mode"; 3GPP TSG RAN WG2 Meeting #84; San Francisco, California, USA; Nov. 11-15, 2013; R2-133920; 7.9.2; 3 pages.

* cited by examiner

METHOD FOR INDICATING CELL COVERAGE ENHANCEMENT MODE AND BASE STATION

CROSS-REFERENCE TO RELATED APPLICATIONS

This application is a continuation of International Application No. PCT/CN2014/071804, filed on Jan. 29, 2014, which is hereby incorporated by reference in its entirety.

TECHNICAL FIELD

The present invention relates to communications technologies, and in particular, to a method for indicating a cell coverage enhancement mode and a base station.

BACKGROUND

An actual coverage range of a cell (or a base station) is determined by factors in many aspects, including a carrier frequency, receiver performance of a terminal, and the like. When cell planning is being performed, on one hand, a carrier frequency is considered, and on the other hand, a network is deployed with reference to a channel environment and receiver performance of a terminal. For example, in a network that has been established or a network that is to be planned to be established, large-scale fading characteristics of most terminals (UE) are similar, and in this case, within a coverage range of a cell, all these most terminals can be served. However, if a few terminals are also within a distance of the coverage range of the cell but have fading characteristics relatively different from those of the most terminals, consequently, when a signal reaches these terminals, receive power is particularly low (for example, below sensitivity of a receiver), and these terminals cannot implement communication. For example, compared with an overground terminal, energy or power, of a terminal in a basement, for receiving a signal is 10 to 20 dB lower.

To enable a terminal in a harsh environment to be covered and served by an existing cell as well, enhanced sending needs to be performed on information that is on a physical channel and is to be received by the terminal in the harsh environment. For different physical channels, enhanced sending methods may be slightly different, but a basic enhancement method is: repeatedly sending, at a predefined resource location, information on a physical channel, so that a peer receiver can receive and combine multiple sent duplicates, thereby improving receiving performance. The predefined resource location herein refers to a predefined extra resource except for a resource used when normal physical channel information is sent. Because there are a relatively small quantity of UE in a harsh environment, when a network status is busy, a network has the right to choose not to serve the UE in the harsh environment, that is, choose to disable a coverage enhancement mode, only by which effective use of a frequency spectrum can be ensured and that ordinary UE with a high priority is preferentially served can be ensured.

In the prior art, to enable UE to learn whether a current cell supports coverage enhancement, a base station determines whether a preset condition to start an enhancement scheme is met. If the condition is met, the base station communicates with a terminal according to a predetermined resource that is to be used in the enhancement scheme; or the base station negotiates, in a dynamic configuration manner, with the terminal about a resource that is to be used in the enhancement scheme, and communicates with the terminal according to the resource that is to be used in the enhancement scheme.

However, in the prior art, a base station considers by default that a network currently supports a coverage enhancement mode, and therefore the base station cannot indicate an actual support status of the coverage enhancement mode to UE.

SUMMARY

Embodiments of the present invention provide a method for indicating a cell coverage enhancement mode and a base station, so as to resolve a technical problem in the prior art that a base station cannot accurately indicate an actual support status of a coverage enhancement mode to UE.

According to a first aspect, an embodiment of the present invention provides a base station, including a transmitter, configured to send system information to a terminal, where the system information is used for indicating to the terminal whether a cell covered by the base station supports coverage enhancement, and the system information includes a master information block MIB and/or a system information block SIB.

With reference to the first aspect, in a first possible implementation manner of the first aspect, the system information is first system information, and the first system information includes coverage enhancement mode indication information, where the coverage enhancement mode indication information is used for indicating to the terminal whether the cell covered by the base station supports coverage enhancement; the transmitter is specifically configured to send, on a first time-frequency resource within at least one first period, the first system information to the terminal, so that the terminal learns, according to the coverage enhancement mode indication information, whether the cell covered by the base station supports coverage enhancement.

With reference to the first possible implementation manner of the first aspect, in a second possible implementation manner of the first aspect, if the first system information is the SIB, the coverage enhancement mode indication information is an indicator bit in the SIB or scheduling information of an SIBX, where the SIBX is a public radio resource configuration information block in a coverage enhancement mode.

With reference to the first aspect, in a third possible implementation manner of the first aspect, the system information is second system information, and the transmitter is specifically configured to send, on a second time-frequency resource within at least one second period, the second system information to the terminal, so that the terminal learns, according to the second system information, that the cell covered by the base station supports coverage enhancement.

With reference to the third possible implementation manner of the first aspect, in a fourth possible implementation manner of the first aspect, a time interval between two consecutive times of sending the second system information by the transmitter is not greater than a first preset time period.

With reference to the fourth possible implementation manner of the first aspect, in a fifth possible implementation manner of the first aspect, the base station further includes a processor configured to, before the transmitter sends the second system information to the terminal, negotiate with the terminal about the at least one second period for sending the second system information.

With reference to any one of the first aspect to the fifth possible implementation manner of the first aspect, in a sixth possible implementation manner of the first aspect, the transmitter is further configured to send a first paging message to the terminal, where the first paging message includes coverage enhancement status indication information, which is used for indicating a current coverage enhancement status of the cell covered by the base station to the terminal.

With reference to any one of the first aspect to the fifth possible implementation manner of the first aspect, in a seventh possible implementation manner of the first aspect, the system information includes coverage enhancement status indication information and a radio resource public information parameter in the coverage enhancement mode, and if a current coverage enhancement status of the cell covered by the base station changes and/or the radio resource public information parameter in the system coverage enhancement mode changes, the transmitter is further configured to send a second paging message to the terminal, where the second paging message is used for indicating to the terminal that the current coverage enhancement status of the cell covered by the base station changes and/or the radio resource public information parameter in the system coverage enhancement mode changes, so that the terminal re-acquires new system information and learns, according to the new system information, a changed coverage enhancement status of the cell covered by the base station and/or a changed radio resource public information parameter in the system coverage enhancement mode.

With reference to any one of the first aspect to the fifth possible implementation manner of the first aspect, in an eighth possible implementation manner of the first aspect, the system information includes coverage enhancement status indication information and a radio resource public information parameter in the coverage enhancement mode, and if a current coverage enhancement status of the cell covered by the base station changes, the transmitter is further configured to send a third paging message to the terminal, where the third paging message carries the coverage enhancement status indication information, so that the terminal learns, according to the coverage enhancement status indication information in the third paging message, a changed coverage enhancement status of the cell covered by the base station.

With reference to the first aspect, in a ninth possible implementation manner of the first aspect, the system information includes a quantity of resources used in a coverage enhancement mode and a maximum quantity of access times of attempting, by the terminal, to access the cell covered by the base station, so that the terminal determines, according to whether a quantity of times of accessing the cell covered by the base station reaches the maximum quantity of access times, a current coverage enhancement status of the cell covered by the base station.

According to a second aspect, an embodiment of the present invention provides a base station including a sending module configured to send system information to a terminal, where the system information is used for indicating to the terminal whether a cell covered by the base station supports coverage enhancement, and the system information includes a master information block MIB and/or a system information block SIB.

With reference to the second aspect, in a first possible implementation manner of the second aspect, the system information is first system information, and the first system information includes coverage enhancement mode indication information, where the coverage enhancement mode indication information is used for indicating to the terminal whether the cell covered by the base station supports coverage enhancement; the sending module is specifically configured to send, on a first time-frequency resource within at least one first period, the first system information to the terminal, so that the terminal learns, according to the coverage enhancement mode indication information, whether the cell covered by the base station supports coverage enhancement.

With reference to the first possible implementation manner of the second aspect, in a second possible implementation manner of the second aspect, if the first system information is the SIB, the coverage enhancement mode indication information is an indicator bit in the SIB or scheduling information of an SIBX, where the SIBX is a public radio resource configuration information block in a coverage enhancement mode.

With reference to the second aspect, in a third possible implementation manner of the second aspect, the system information is second system information, and the sending module is specifically configured to send, on a second time-frequency resource within at least one second period, the second system information to the terminal, so that the terminal learns, according to the second system information, that the cell covered by the base station supports coverage enhancement.

With reference to the third possible implementation manner of the second aspect, in a fourth possible implementation manner of the second aspect, a time interval between two consecutive times of sending the second system information by the sending module is not greater than a first preset time period.

With reference to the fourth possible implementation manner of the second aspect, in a fifth possible implementation manner of the second aspect, the base station further includes a negotiation module configured to, before the sending module sends the second system information to the terminal, negotiate with the terminal about the at least one second period for sending the second system information.

With reference to any one of the second aspect to the fifth possible implementation manner of the second aspect, in a sixth possible implementation manner of the second aspect, the sending module is further configured to send a first paging message to the terminal, where the first paging message includes coverage enhancement status indication information, which is used for indicating a current coverage enhancement status of the cell covered by the base station to the terminal.

With reference to any one of the second aspect to the fifth possible implementation manner of the second aspect, in a seventh possible implementation manner of the second aspect, the system information includes coverage enhancement status indication information and a radio resource public information parameter in the coverage enhancement mode, and if a current coverage enhancement status of the cell covered by the base station changes and/or the radio resource public information parameter in the system coverage enhancement mode changes, the sending module is further configured to send a second paging message to the terminal, where the second paging message is used for indicating to the terminal that the current coverage enhancement status of the cell covered by the base station changes and/or the radio resource public information parameter in the system coverage enhancement mode changes, so that the terminal re-acquires new system information and learns, according to the new system information, a changed coverage enhancement status of the cell covered by the base station and/or a changed radio resource public information parameter in the system coverage enhancement mode.

With reference to any one of the second aspect to the fifth possible implementation manner of the second aspect, in an eighth possible implementation manner of the second aspect, the system information includes coverage enhancement status indication information and a radio resource public information parameter in the coverage enhancement mode, and if a current coverage enhancement status of the cell covered by the base station changes, the sending module is further configured to send a third paging message to the terminal, where the third paging message carries the coverage enhancement status indication information, so that the terminal learns, according to the coverage enhancement status indication information in the third paging message, a changed coverage enhancement status of the cell covered by the base station.

With reference to the second aspect, in a ninth possible implementation manner of the second aspect, the system information includes a quantity of resources used in a coverage enhancement mode and a maximum quantity of access times of attempting, by the terminal, to access the cell covered by the base station, so that the terminal determines, according to whether a quantity of times of accessing the cell covered by the base station reaches the maximum quantity of access times, a current coverage enhancement status of the cell covered by the base station.

According to a third aspect, an embodiment of the present invention provides a method for indicating a cell coverage enhancement mode including sending, by a base station, system information to a terminal, where the system information is used for indicating to the terminal whether a cell covered by the base station supports coverage enhancement, and the system information includes a master information block MIB and/or a system information block SIB.

With reference to the third aspect, in a first possible implementation manner of the third aspect, the system information is first system information, and the first system information includes coverage enhancement mode indication information, where the coverage enhancement mode indication information is used for indicating to the terminal whether the cell covered by the base station supports coverage enhancement, wherein sending, by a base station, system information to a terminal includes sending, by the base station on a first time-frequency resource within at least one first period, the first system information to the terminal, so that the terminal learns, according to the coverage enhancement mode indication information, whether the cell covered by the base station supports coverage enhancement.

With reference to the first possible implementation manner of the third aspect, in a second possible implementation manner of the third aspect, if the first system information is the SIB, the coverage enhancement mode indication information is an indicator bit in the SIB or scheduling information of an SIBX, where the SIBX is a public radio resource configuration information block in a coverage enhancement mode.

With reference to the third aspect, in a third possible implementation manner of the third aspect, the system information comprises second system information, and wherein sending, by a base station, system information to a terminal includes sending, by the base station on a second time-frequency resource within at least one second period, the second system information to the terminal, so that the terminal learns, according to the second system information, that the cell covered by the base station supports coverage enhancement.

With reference to the third possible implementation manner of the third aspect, in a fourth possible implementation manner of the third aspect, sending, by the base station on a second time-frequency resource within at least one second period, the second system information to the terminal specifically includes a time interval between two consecutive times of sending the second system information by the base station being not greater than a first preset time period.

With reference to the fourth possible implementation manner of the third aspect, in a fifth possible implementation manner of the third aspect, before sending, by the base station on a second time-frequency resource within at least one second period, the second system information to the terminal, the method further includes negotiating, by the base station, with the terminal about the at least one second period for sending the second system information.

With reference to any one of the third aspect to the fifth possible implementation manner of the third aspect, in a sixth possible implementation manner of the third aspect, the method further includes sending, by the base station, a first paging message to the terminal, where the first paging message includes coverage enhancement status indication information, which is used for indicating a current coverage enhancement status of the cell covered by the base station to the terminal.

With reference to any one of the third aspect to the fifth possible implementation manner of the third aspect, in a seventh possible implementation manner of the third aspect, the system information includes coverage enhancement status indication information and a radio resource public information parameter in the coverage enhancement mode, and if a current coverage enhancement status of the cell covered by the base station changes and/or the radio resource public information parameter in the system coverage enhancement mode changes, the method further includes sending, by the base station, a second paging message to the terminal, where the second paging message is used for indicating to the terminal that the current coverage enhancement status of the cell covered by the base station changes and/or the radio resource public information parameter in the system coverage enhancement mode changes, so that the terminal re-acquires new system information and learns, according to the new system information, a changed coverage enhancement status of the cell covered by the base station and/or a changed radio resource public information parameter in the system coverage enhancement mode.

With reference to any one of the third aspect to the fifth possible implementation manner of the third aspect, in an eighth possible implementation manner of the third aspect, the system information includes coverage enhancement status indication information and a radio resource public information parameter in the coverage enhancement mode, and if a current coverage enhancement status of the cell covered by the base station changes, the method further includes sending, by the base station, a third paging message to the terminal, where the third paging message carries the coverage enhancement status indication information, so that the terminal learns, according to the coverage enhancement status indication information in the third paging message, a changed coverage enhancement status of the cell covered by the base station.

With reference to the third aspect, in a ninth possible implementation manner of the third aspect, the system information includes a quantity of resources used in a coverage enhancement mode and a maximum quantity of access times of attempting, by the terminal, to access the cell covered by the base station, so that the terminal determines, according to whether a quantity of times of accessing the cell covered by the base station reaches the maximum quantity of access times, a current coverage enhancement status of the cell covered by the base station.

According to the method for indicating a cell coverage enhancement mode and the base station that are provided in the embodiments of the present invention, a transmitter sends, to a terminal, system information used for indicating whether a cell covered by the base station supports coverage enhancement, so that the terminal can accurately learn whether the cell supports communication in a coverage enhancement mode, and the terminal is notified in a timely manner when the cell does not support communication in the coverage enhancement mode, which avoids blind access of the terminal and reduces power consumption of the terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
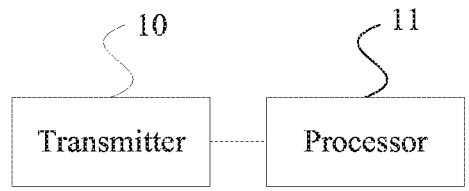
FIG. 1 is a schematic structural diagram of Embodiment 2 of a base station according to the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

A terminal, that is, user equipment, involved in this application may be a wireless terminal or a wired terminal. The terminal may be a terminal that is in a harsh environment and that needs to communicate by using a coverage enhancement mode. The wireless terminal may refer to a device that provides a user with voice and/or data connectivity, a handheld device with a wireless connection function, or another processing device connected to a radio modem. The wireless terminal may communicate with one or more core networks by using a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit (Subscriber Unit), a subscriber station, a mobile station, a mobile, a remote station, an access point, a remote terminal, an access terminal, a user terminal, a user agent, a user device, or user equipment.

The base station (for example, an access point) involved in this application may be an access point in a WLAN, and may also refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS) in GSM or CDMA, may also be a base station (NodeB) in WCDMA, and may further be an evolved NodeB (eNodeB) in LTE, which is not limited in the present application.

Embodiment 1 of the present invention provides a base station, where the base station includes: a transmitter 10, configured to send system information to a terminal, where the system information is used for indicating to the terminal whether a cell covered by the base station supports coverage enhancement, and the system information includes a master information block (MIB) and/or a system information block (SIB).

Specifically, the transmitter 10 may send the system information to the terminal according to an ordinary sending manner specified in a standard or according to an enhanced sending manner. When the system information is sent according to different sending manners, different resources are used. The system information may be an MIB, or may be an SIB, or may be an MIB and an SIB. There may be one SIB or multiple SIBs (an SIB1, an SIB2, an SIB3, and the like).

Assuming that the system information is a pure MIB, according to an MIB sending manner specified in the standard, the transmitter 10 uses a physical broadcast channel (PBCH) to carry and transmit the MIB. The PBCH sends the MIB by using 40 ms as a period, where four segments is obtained by means of segmentation and sending is performed in four consecutive radio frames. Within one period, MIB information carried on the PBCH is the same. In each radio frame, a PBCH segment is sent only in the first subframe, and only occupies the first four OFDM symbols in the second timeslot. Therefore, these OFDM symbols and the used subframe are time-frequency resources used for sending the system information.

If the transmitter 10 sends the MIB to the terminal according to the enhanced sending manner, that is, an enhanced MIB is sent, the enhanced MIB herein refers to an MIB duplicate sent on a predefined extra resource within an MIB sending period. There may be many resource mapping manners of the enhanced MIB, and a resource mapping method used by the enhanced MIB is not limited in this embodiment of the present invention. For example, for the MIB enhanced sending manner, 40 ms is used as a period, where four segments is obtained by means of segmentation and sending is performed in four consecutive radio frames; however, in the first subframe of each radio frame, besides that the first four OFDM symbols of the second timeslot are used for PBCH mapping, the last three OFDM symbols of the first timeslot and the fifth OFDM symbol of the second timeslot are additionally used for repeatedly mapping the PBCH once. That is, an MIB sent on the last three OFDM symbols of the first timeslot and the fifth OFDM symbol of the second timeslot is the enhanced MIB, and the last three OFDM symbols of the first timeslot and the fifth OFDM symbol of the second timeslot are the predefined extra resource within the MIB sending period.

However, no matter which one of the foregoing manners is used for sending the system information, the system information provided in this embodiment of the present invention can indicate to the terminal whether the cell covered by the base station supports coverage enhancement, that is, the system information provided in this embodiment of the present invention indicates to the terminal according to an actual coverage enhancement support status of the cell covered by the base station. The system information may indicate the coverage enhancement support status of the cell to the terminal by using a corresponding indicator bit, or may indicate the coverage enhancement support status of the cell to the terminal by carrying other indication information. A manner in which the system information indicates the coverage enhancement support status of the cell to the terminal is not limited in this embodiment of the present invention. The system information may enable the terminal to learn an accurate coverage enhancement support status of the cell. When the terminal learns that the cell supports communication in a coverage enhancement mode, the terminal may access the cell and communicate with the base station by using the coverage enhancement mode. In this embodiment of the present invention, it is avoided that when not supporting the coverage enhancement mode, the base station still indicates a default support status of the base station to the terminal, which causes continuous and blind access of the terminal, so that power consumption of the terminal is excessively large, or the terminal continuously reports an error to a higher layer.

According to the base station provided in this embodiment of the present invention, a transmitter sends, to a terminal, system information used for indicating whether a cell covered by the base station supports coverage enhancement, so that the terminal can accurately learn whether the cell supports communication in a coverage enhancement mode, and the terminal is notified in a timely manner when the cell does not support communication in the coverage enhancement mode, which avoids blind access of the terminal and reduces power consumption of the terminal.

Based on the foregoing Embodiment 1, as a feasible implementation manner of this embodiment of the present invention, this embodiment involves a process in which when the system information is first system information, the transmitter 10 sends the system information to the terminal. The first system information may be ordinary system information, that is, system information sent according to the sending manner specified in the standard (that is, system information that is not sent on an extra resource). The first system information includes coverage enhancement mode indication information, where the coverage enhancement mode indication information is used for indicating to the terminal whether the cell covered by the base station supports coverage enhancement. The foregoing transmitter 10 is specifically configured to send, on a first time-frequency resource within at least one first period, the first system information to the terminal, so that the terminal learns, according to the foregoing coverage enhancement mode indication information, whether the cell covered by the base station supports coverage enhancement.

Specifically, the foregoing first period may be a system information sending period, which may be an MIB sending period (40 ms), or may be an SIB sending period. The foregoing first time-frequency resource refers to a time-frequency resource for sending an ordinary MIB or SIB according to the sending manner specified in the standard, for example, the foregoing first time-frequency resource may be the second timeslot of the first subframe of the foregoing radio frame used when the MIB is sent, and the first four OFDM symbols of the second timeslot.

The transmitter 10 sends the first system information within one or more first periods and notifies, by using the coverage enhancement mode indication information included in the first system information, the terminal of a coverage enhancement mode support status of the cell covered by the base station.

Optionally, the coverage enhancement mode indication information may be an idle bit in the MIB or an indicator bit in the SIB.

Optionally, when the first system information is the SIB, the coverage enhancement mode indication information may also be scheduling information of an SIBX, where the SIBX is a public radio resource configuration information block in the coverage enhancement mode. That is, public radio resource configuration information about coverage enhancement is defined as an SIBX (the SIBX may be one or several SIBs), and scheduling information of the SIBX is added into an SIB1 (the SIB1 includes scheduling information of information blocks such as an SIB2, an SIB3, and the SIBX). In this case, an extra bit may not be required to indicate whether the cell supports coverage enhancement, and the terminal determines, by determining whether the SIB1 includes scheduling information of an enhanced SIBX, whether the cell supports communication in the coverage enhancement mode. If a field is extended in an existing SIB, the terminal further needs to obtain a specific SIB by demodulation, so as to obtain information about whether the cell supports coverage enhancement. When the cell supports communication in the coverage enhancement mode, the SIB1 sent by the transmitter 10 to the terminal carries the scheduling information of the SIBX, so that the terminal can learn, by determining whether the SIB1 carries the scheduling information of the SIBX, whether the cell supports the coverage enhancement mode.

In another case, if an SIB1 sent within a previous first period does not carry the scheduling information of the SIBX, an SIB1 sent within a next period or next few periods carries the scheduling information of the SIBX, and a moment for sending an SIB1 that carries the scheduling information of the SIBX and a moment for sending an SIB1 that does not carry the scheduling information of the SIBX are within a preset time period, the terminal may also consider that the cell supports the coverage enhancement mode.

According to the base station provided in this embodiment of the present invention, a transmitter sends, on a first time-frequency resource within at least one first period, first system information that includes coverage enhancement mode indication information to a terminal, so that the terminal can accurately learn, according to the coverage enhancement mode indication information, whether a cell supports communication in a coverage enhancement mode, and the terminal is notified in a timely manner when the cell does not support communication in the coverage enhancement mode, which avoids blind access of the terminal and reduces power consumption of the terminal.

Based on the foregoing Embodiment 1, as another feasible implementation manner of this embodiment of the present invention, this embodiment involves a process in which when the system information is second system information, the transmitter 10 sends the system information to the terminal. The second system information may be system information sent according to the enhanced sending manner, that is, a duplicate of ordinary system information sent on an extra resource within a system information sending period. In this embodiment, the second system information may be enhanced first system information. Further, the foregoing transmitter 10 is specifically configured to send, on a second time-frequency resource within at least one second period, the second system information to the terminal, so that the terminal learns, according to the second system information, that the cell covered by the base station supports coverage enhancement.

Specifically, the second period may be the same as the foregoing first period, and a quantity of the second period and a quantity of the first period may be the same, or may be different. The second period may be a period for sending enhanced system information, which may be a period (40 ms) for sending an enhanced MIB, or may be a period for sending an enhanced SIB. The enhanced system information herein may be a duplicate of first system information sent on an extra time-frequency resource within a period for sending the first system information. For example, the enhanced MIB may be the MIB sent on the last three OFDM symbols of the first timeslot and the fifth OFDM symbol of the second timeslot in the foregoing embodiment. The second time-frequency resource within the second period may be actually the last three OFDM symbols of the first timeslot and the fifth OFDM symbol of the second timeslot.

Because a second time-frequency resource used when the transmitter 10 sends the second system information has a corresponding resource mapping on a terminal side, the terminal may know which resources are used by the transmitter 10 as the second time-frequency resource for sending the second system information. Therefore, as long as the transmitter 10 sends the second system information to the terminal, the terminal can learn, according to the resource mapping on the terminal side, that the system information is enhanced system information, which indicates that the cell covered by the base station supports coverage enhancement.

Further, a time interval between two consecutive times of sending the second system information by the foregoing transmitter 10 is not greater than a first preset time period.

For one or more second periods used by the foregoing transmitter 10 for sending the second system information, actually, the transmitter 10 does not send the second system information within each second period (the second period for sending the second system information may be negotiated by the base station and the terminal, or may be determined by the base station). The transmitter 10 may send the second system information at a moment T1 and send the second system information again at a moment T2, and starting from the moment T2, an interval of sending a next piece of the second system information by the base station is not greater than the first preset time period, where the first preset time period may be explicitly specified in a protocol, for example, a time of 10 radio frames or a time of 10 PBCH periods.

According to the base station provided in this embodiment of the present invention, a transmitter sends, on a second time-frequency resource within at least one second period, second system information to a terminal, so that the terminal can accurately learn, according to the second system information, whether a cell supports communication in a coverage enhancement mode, and the terminal is notified in a timely manner when the cell does not support communication in the coverage enhancement mode, which avoids blind access of the terminal and reduces power consumption of the terminal.

FIG. 1 is a schematic structural diagram of Embodiment 2 of a base station according to the present invention. Second system information involved in this embodiment is an enhanced SIB. Based on the foregoing embodiment, further, the base station further includes: a processor 11, configured to: before the foregoing transmitter 10 sends the second system information to the terminal, negotiate with the terminal about at least one second period for sending the second system information.

Specifically, the processor 11 negotiates with the terminal about a second period for sending the enhanced SIB by the transmitter 10, that is, the processor 11 negotiates about a second period within which the enhanced SIB is sent and a second period within which the enhanced SIB is not sent. After the processor 11 determines the second period for sending the enhanced SIB, the transmitter 10 sends, on a second time-frequency resource within the second period, the enhanced SIB.

It should be noted that the enhanced SIB may refer to a normal SIB defined to be repeatedly sent on a second time-frequency resource, and content in each SIB sent on a second time-frequency resource within a second period is the same, for example, each SIB includes resource configuration information required in a coverage enhancement mode (that is, includes scheduling information of an SIBX); or the enhanced SIB may refer to an SIB that carries scheduling information of an SIBX and that is sent only within the determined second period for sending the enhanced SIB, but an SIB sent within another second period does not include the scheduling information of the SIBX.

According to the base station provided in this embodiment of the present invention, a processor negotiates with a terminal about a second period for sending an enhanced SIB, and sends, on a second time-frequency resource within the negotiated second period, the enhanced SIB to the terminal, so that the terminal can accurately learn, according to the enhanced SIB, whether a cell supports communication in a coverage enhancement mode, and the terminal is notified in a timely manner when the cell does not support communication in the coverage enhancement mode, which avoids blind access of the terminal and reduces power consumption of the terminal.

In the foregoing embodiment, system information sent by a transmitter to a terminal is used for indicating whether a cell covered by a base station supports coverage enhancement. However, in an actual communication process, it generally occurs that the cell covered by the base station supports coverage enhancement, but a coverage enhancement status of the cell is off at a moment, which may easily cause: in a case in which the terminal learns that the cell covered by the base station supports coverage enhancement, the terminal continuously makes an access attempt, so that power consumption of the terminal increases. Therefore, in order to avoid this case, in the following embodiment, whether the current coverage enhancement status of the cell is on or off is further indicated to the terminal in a case in which the cell supports coverage enhancement. For better description and understanding of this embodiment, that the system information is an SIB is used as an example in the following embodiment.

Based on the foregoing embodiment, as a feasible implementation manner of this embodiment of the present invention, this embodiment involves a process in which the transmitter 10 indicates a current coverage enhancement status of the cell to the terminal by sending a first paging message to the terminal. The foregoing transmitter 10 is further configured to send the first paging message to the terminal, where the first paging message includes coverage enhancement status indication information, which is used for indicating the current coverage enhancement status of the cell covered by the base station to the terminal.

Specifically, the terminal obtains a system frame number (SFN) by detecting a PBCH, where the PBCH herein may be a normal PBCH (a PBCH used for sending according to a sending manner specified in a standard), or may be an enhanced PBCH (a PBCH used for sending according to an enhanced manner). The base station and the terminal may predefine, according to the obtained SFN, a period for enhanced sending (for example, for occurrence of the predefined period for enhanced sending, a location of the period for enhanced sending may be obtained in a manner of SFN mod 12=0), that is, the foregoing second period for sending an enhanced SIB. If obtaining the SFN by detecting normal PBCH sending, the UE may learn, by checking coverage enhancement mode indication information included in an SIB1, whether the cell supports the coverage enhancement mode.

When the terminal learns, according to the enhanced SIB or the coverage enhancement indication information in the SIB, that the cell supports coverage enhancement, the terminal may further learn, by using the first paging message that carries the coverage enhancement status indication information and is sent by the transmitter 10, whether the current coverage enhancement status of the cell is on or off, that is, the terminal can clearly know the current coverage enhancement status of the cell, so that in a case in which the current coverage enhancement status of the cell is off, the terminal does not continuously attempt to access the cell, which reduces power consumption of the terminal.

According to the base station provided in this embodiment of the present invention, a transmitter sends system information to a terminal, so that the terminal learns, according to the system information, a coverage enhancement mode support status of a cell covered by the base station; in addition, the transmitter sends, to the terminal, a first paging message carrying coverage enhancement status indication information, so that the terminal learns a current coverage enhancement status of the cell according to the coverage enhancement indication information, which avoids blind access of the terminal in a case in which the current coverage enhancement status of the cell is off, and further reduces power consumption of the terminal.

Based on the foregoing embodiment, as another feasible implementation manner of this embodiment of the present invention, this embodiment involves a process in which the transmitter 10 indicates, by sending a second paging message to the terminal, to the terminal that a coverage enhancement status of the cell changes and/or a radio resource public information parameter in the coverage enhancement mode changes, so that the terminal re-acquires new system information. Further, if a current coverage enhancement status of the cell covered by the base station changes and/or the radio resource public information parameter in the system coverage enhancement mode changes, the foregoing transmitter 10 is further configured to send the second paging message to the terminal, where the second paging message is used for indicating to the terminal that the current coverage enhancement status of the cell covered by the base station changes and/or the radio resource public information parameter in the system coverage enhancement mode changes, so that the terminal re-acquires the new system information and learns, according to the new system information, a changed coverage enhancement status of the cell and/or a changed radio resource public information parameter in the system coverage enhancement mode.

Specifically, the terminal obtains an SFN by detecting a PBCH, where the PBCH herein may be a normal PBCH (a PBCH used for sending according to a sending manner specified in a standard), or may be an enhanced PBCH (a PBCH used for sending according to an enhanced manner). The base station and the terminal may predefine, according to the obtained SFN, a period for enhanced sending, that is, the foregoing second period for sending an enhanced SIB. If obtaining the SFN by detecting normal PBCH sending, the terminal may learn, by checking coverage enhancement mode indication information included in an SIB1, whether the cell supports the coverage enhancement mode.

When the terminal learns, according to the enhanced SIB or the coverage enhancement indication information in the SIB, that the cell supports coverage enhancement, the terminal may further learn, according to the coverage enhancement status indication information included in the system information sent by the transmitter 10, whether the current coverage enhancement status of the cell is on or off, that is, the terminal can clearly know the current coverage enhancement status of the cell, so that in a case in which the current coverage enhancement status of the cell is off, the terminal does not continuously attempt to access the cell, which reduces power consumption of the terminal.

On the other hand, if the foregoing transmitter 10 sends the enhanced SIB, and therefore the terminal learns that the cell supports the coverage enhancement mode, there may be multiple situations of a manner for sending the enhanced SIB, which are respectively:

A first situation: the transmitter 10 obtains, by calculation according to a rule predefined by the base station and the terminal, for example, according to an SFN, a location of a period for sending the enhanced SIB (a definition of the enhanced SIB herein is described above). For example, sending of the enhanced SIB needs to be completed within a time period starting from a radio frame whose SFN=0, that is, the predefined rule herein only predefines a time period for sending the enhanced SIB. Further, the transmitter 10 sends, according to a specific time-frequency resource that is within the time period for sending the enhanced SIB and is defined by the base station and the terminal, the enhanced SIB; in addition, coverage enhancement status indication information carried in an SIB1 in the enhanced SIB may be indicated according to a current actual situation of the cell. In addition, in a time except the predefined time period for sending the enhanced SIB, when the transmitter 10 may send a normal SIB, scheduling information of an SIBX may not be included.

A second situation: when the transmitter 10 sends the enhanced SIB at a predefined time-frequency resource location, when a status indicated by coverage enhancement status indication information in an SIB1 is off, an SIBX including radio resource public information in the coverage enhancement mode in the SIB1 may not be scheduled, that is, the coverage enhancement mode indication information may not be carried in the SIB1.

A third situation: an extension field of the SIB may include scheduling information of an SIBX, or may not include scheduling information of an SIBX, or when a coverage enhancement status that is of the cell and is indicated by coverage enhancement status indication information in an SIB1 or a radio resource public information parameter in an enhancement mode changes, the second paging message may not be sent to notify ordinary UE. However, when the coverage enhancement status of the cell or the radio resource public information parameter in the enhancement mode changes, the second paging message needs to be sent to notify a terminal that needs coverage enhancement of the change. The second paging message may indicate to the terminal that a current coverage enhancement status of the cell covered by the base station changes and/or the radio resource public information parameter in the system coverage enhancement mode changes, so that the terminal can re-acquire new system information, and learn, according to a coverage enhancement status and a radio resource public information parameter in the enhancement mode that are in the new system information, a changed coverage enhancement status of the cell and/or a changed radio resource public information parameter in the enhancement mode.

A fourth situation: if the base station and the terminal predefine relatively many time-frequency resources, in order to improve resource efficiency, actually, the transmitter 10 may not send the enhanced SIB on each predefined time-frequency resource. As long as the terminal does not detect the enhanced SIB, the terminal may attempt to perform detection again at a next predefined time-frequency resource location. In addition, when learning, according to the coverage enhancement status indication information, that a current coverage enhancement status of the cell is on, the terminal considers that the cell has currently been working in the coverage enhancement mode, and may start communication with the base station according to radio resource configuration in the enhancement mode in the SIB; when a CEM status detected by the terminal is off, the UE determines, according to an actual requirement, a time for detecting whether the coverage enhancement status of the cell indicated by the coverage enhancement status indication information in the SIB turns to on.

According to the base station provided in this embodiment of the present invention, a transmitter sends, to a terminal, system information including coverage enhancement status indication information and a radio resource public information parameter in a coverage enhancement mode, so that the terminal learns, according to the system information, a coverage enhancement mode support status of a cell covered by the base station and learns, in a case in which the cell supports the coverage enhancement mode, whether a current coverage enhancement status of the cell is on or off, which avoids blind access of the terminal in a case in which the current coverage enhancement status of the cell is off, and further reduces power consumption of the terminal; in addition, when the coverage enhancement status of the cell changes, the transmitter sends a second paging message to the terminal, so that the terminal can re-acquire new system information and learn, according to the new system information, a changed coverage enhancement status of the cell and/or a changed radio resource public information parameter in the system coverage enhancement mode, so that the terminal can better perform communication with the base station.

Based on the foregoing embodiment, as a third feasible implementation manner of this embodiment of the present invention, this embodiment involves a process in which the transmitter 10 indicates, by sending a third paging message to the terminal, to the terminal that a coverage enhancement status of the cell changes, so that the terminal learns, according to the third paging message, a changed coverage enhancement status of the cell. Further, the foregoing system information includes coverage enhancement status indication information and a radio resource public information parameter in the coverage enhancement mode, and if a current coverage enhancement status of the cell covered by the base station changes, the foregoing transmitter 10 is further configured to send the third paging message to the terminal, where the third paging message carries the coverage enhancement status indication information, so that the terminal learns, according to the coverage enhancement status indication information in the third paging message, the changed coverage enhancement status of the cell covered by the base station.

Specifically, the terminal obtains an SFN by detecting a PBCH, where the PBCH herein may be a normal PBCH (a PBCH used for sending according to a sending manner specified in a standard), or may be an enhanced PBCH (a PBCH used for sending according to an enhanced manner). The base station and the terminal may predefine, according to the obtained SFN, a period for enhanced sending, that is, the foregoing second period for sending an enhanced SIB. If obtaining the SFN by detecting normal PBCH sending, the terminal may learn, by checking coverage enhancement mode indication information included in an SIB1, whether the cell supports the coverage enhancement mode.

When the terminal learns, according to the enhanced SIB or the coverage enhancement indication information in the SIB, that the cell supports coverage enhancement, the terminal may further learn, according to the coverage enhancement status indication information included in the system information sent by the transmitter 10, whether the current coverage enhancement status of the cell is on or off, that is, the terminal can clearly know the current coverage enhancement status of the cell, so that in a case in which the current coverage enhancement status of the cell is off, the terminal does not continuously attempt to access the cell, which reduces power consumption of the terminal.

When working in a coverage enhancement state, the terminal may not need to periodically detect the third paging message. When the terminal works abnormally, that is, when the coverage enhancement status of the cell changes, the transmitter 10 sends the third paging message to the terminal, where the third paging message carries the coverage enhancement status indication information, so that the terminal can learn, according to the coverage enhancement status indication information in the third paging message, the changed coverage enhancement status of the cell, that is, the terminal does not need to acquire new system information again to learn the changed coverage enhancement status of the cell. In addition, because it is easier for the terminal to detect the third paging message than to detect the system information, power consumption of the terminal is further reduced.

According to the base station provided in this embodiment of the present invention, a transmitter sends, to a terminal, system information including coverage enhancement status indication information and a radio resource public information parameter in a coverage enhancement mode, so that the terminal learns, according to the system information, a coverage enhancement mode support status of a cell covered by the base station and learns, in a case in which the cell supports the coverage enhancement mode, whether a current coverage enhancement status of the cell is on or off, which avoids blind access of the terminal in a case in which the current coverage enhancement status of the cell is off, and further reduces power consumption of the terminal; in addition, when the coverage enhancement status of the cell changes, the transmitter sends a third paging message to the terminal, so that the terminal can learn again, according to coverage enhancement status indication information in the third paging message, a changed coverage enhancement status of the cell, so that the terminal can better perform communication with the base station, and the power consumption of the terminal is further reduced.

Based on the foregoing embodiment, as a fourth possible implementation manner of this embodiment of the present invention, this embodiment involves a specific process in which when the system information includes a quantity of resources used in the coverage enhancement mode and a maximum quantity of access times of attempting, by the terminal, to access the cell covered by the base station, the terminal learns, according to the system information, a current coverage enhancement status of the cell covered the base station.

Specifically, the transmitter 10 sends the system information to the terminal, where the system information includes the quantity of resources used in the coverage enhancement mode and the maximum quantity of access times of attempting, by the terminal, to access the cell covered by the base station, and the base station may further adjust, by configuring the quantity of resources in the coverage enhancement mode, a quantity of terminals with access coverage enhancement in a network, for example, density of time-frequency resources of a physical random access channel (PRACH) may be adjusted. Optionally, the system information may be sent within at least one first period, or may be sent within at least one second period, or may be sent selectively within at least one first period or second period, where the selective sending herein refers to choosing not to send within some first periods or second periods. When the terminal always cannot succeed in accessing a network by using the PRACH, and after a maximum quantity of access attempt times that is configured by the base station is reached, the terminal considers that the base station may not be able to fully support the coverage enhancement mode in this case, that is, the terminal learns that the current coverage enhancement status of the cell covered by the base station is off. Therefore, the terminal may make an access attempt again after waiting for a random time period, instead of reporting an error to a high layer.

According to the base station provided in this embodiment of the present invention, a transmitter sends system information to a terminal, so that the terminal learns, according to the system information, whether a cell covered by the base station supports a coverage enhancement mode; the terminal attempts, by using a quantity of resources used in the coverage enhancement mode and a maximum quantity of access times of attempting, by the terminal, to access the cell covered by the base station that are included in the system information, to access the cell covered by the base station, and after the maximum quantity of access times is reached, the terminal still cannot access the cell and then determines that a current coverage enhancement status of the cell is off, and therefore the terminal chooses to access again after a time period, which avoids continuous and blind access of the terminal in a case in which the current coverage enhancement status of the cell is off, and reduces power consumption of the terminal.

Embodiment 3 of the present invention provides a base station, where the base station includes: a sending module 20, configured to send system information to a terminal, where the system information is used for indicating to the terminal whether a cell covered by the base station supports coverage enhancement, and the system information includes an MIB and/or an SIB.

Specifically, the sending module 20 may send the system information to the terminal according to an ordinary sending manner specified in a standard or according to an enhanced sending manner. When the system information is sent according to different sending manners, different resources are used. The system channel may be an MIB, or may be an SIB, or may be an MIB and an SIB. There may be one SIB or multiple SIBs (an SIB1, an SIB2, an SIB3, and the like).

Assuming that the system information is a pure MIB, according to an MIB sending manner specified in the standard, the sending module 20 uses a PBCH to carry and transmit the MIB. The PBCH sends the MIB by using 40 ms as a period, where four segments is obtained by means of segmentation and sending is performed in four consecutive radio frames. Within one period, MIB information carried on the PBCH is the same. In each radio frame, a PBCH segment is sent only in the first subframe, and only occupies the first four OFDM symbols in the second timeslot. Therefore, these OFDM symbols and the used subframe are time-frequency resources used for sending the system information.

If the sending module 20 sends the MIB to the terminal according to the enhanced sending manner, that is, an enhanced MIB is sent, the enhanced MIB herein refers to an MIB duplicate sent on a predefined extra resource within an MIB sending period. There may be many resource mapping manners of the enhanced MIB, and a resource mapping method used by the enhanced MIB is not limited in this embodiment of the present invention. For example, for the MIB enhanced sending manner, 40 ms is used as a period, where four segments is obtained by means of segmentation and sending is performed in four consecutive radio frames; however, in the first subframe of each radio frame, besides that the first four OFDM symbols of the second timeslot are used for PBCH mapping, the last three OFDM symbols of the first timeslot and the fifth OFDM symbol of the second timeslot are additionally used for repeatedly mapping the PBCH once. That is, an MIB sent on the last three OFDM symbols of the first timeslot and the fifth OFDM symbol of the second timeslot is the enhanced MIB, and the last three OFDM symbols of the first timeslot and the fifth OFDM symbol of the second timeslot are the predefined extra resource within the MIB sending period.

However, no matter which one of the foregoing manners is used for sending the system information, the system information provided in this embodiment of the present invention can indicate to the terminal whether the cell covered by the base station supports coverage enhancement, that is, the system information provided in this embodiment of the present invention indicates to the terminal according to an actual coverage enhancement support status of the cell covered by the base station. The system information may indicate the coverage enhancement support status of the cell to the terminal by using a corresponding indicator bit, or may indicate the coverage enhancement support status of the cell to the terminal by carrying other indication information. A manner in which the system information indicates the coverage enhancement support status of the cell to the terminal is not limited in this embodiment of the present invention. The system information may enable the terminal to learn an accurate coverage enhancement support status of the cell. When the terminal learns that the cell supports communication in a coverage enhancement mode, the terminal may access the cell and communicate with the base station by using the coverage enhancement mode. In this embodiment of the present invention, it is avoided that when not supporting the coverage enhancement mode, the base station still indicates a default support status of the base station to the terminal, which causes continuous and blind access of the terminal, so that power consumption of the terminal is excessively large, or the terminal continuously reports an error to a higher layer.

According to the base station provided in this embodiment of the present invention, a sending module sends, to a terminal, system information used for indicating whether a cell covered by the base station supports coverage enhancement, so that the terminal can accurately learn whether the cell supports communication in a coverage enhancement mode, and the terminal is notified in a timely manner when the cell does not support communication in the coverage enhancement mode, which avoids blind access of the terminal and reduces power consumption of the terminal.

Based on the foregoing Embodiment 1, as a feasible implementation manner of this embodiment of the present invention, this embodiment involves a process in which when the system information is first system information, the sending module 20 sends the system information to the terminal. The first system information may be ordinary system information, that is, system information sent according to the sending manner specified in the standard (that is, system information that is not sent on an extra resource). The first system information includes coverage enhancement mode indication information, where the coverage enhancement mode indication information is used for indicating to the terminal whether the cell covered by the base station supports coverage enhancement. The foregoing sending module 20 is specifically configured to send, on a first time-frequency resource within at least one first period, the first system information to the terminal, so that the terminal learns, according to the foregoing coverage enhancement mode indication information, whether the cell covered by the base station supports coverage enhancement.

Specifically, the foregoing first period may be a system information sending period, which may be an MIB sending period (40 ms), or may be an SIB sending period. The foregoing first time-frequency resource refers to a time-frequency resource for sending an ordinary MIB or SIB according to the sending manner specified in the standard, for example, the foregoing first time-frequency resource may be the second timeslot of the first subframe of the foregoing radio frame used when the MIB is sent, and the first four OFDM symbols of the second timeslot.

The sending module 20 sends the first system information within one or more first periods and notifies, by using the coverage enhancement mode indication information included in the first system information, the terminal of a coverage enhancement mode support status of the cell covered by the base station.

Optionally, the coverage enhancement mode indication information may be an idle bit in the MIB or an indicator bit in the SIB.

Optionally, when the first system information is the SIB, the coverage enhancement mode indication information may also be scheduling information of an SIBX, where the SIBX is a public radio resource configuration information block in the coverage enhancement mode. That is, public radio resource configuration information about coverage enhancement is defined as an SIBX (the SIBX may be one or several SIBs), and scheduling information of the SIBX is added into an SIB1 (the SIB1 includes scheduling information of information blocks such as an SIB2, an SIB3, and the SIBX). In this case, an extra bit may not be required to indicate whether the cell supports coverage enhancement, and the terminal determines, by determining whether the SIB1 includes scheduling information of an enhanced SIBX, whether the cell supports communication in the coverage enhancement mode. If a field is extended in an existing SIB, the terminal further needs to obtain a specific SIB by demodulation, so as to obtain information about whether the cell supports coverage enhancement. When the cell supports communication in the coverage enhancement mode, the SIB1 sent by the sending module 20 to the terminal carries the scheduling information of the SIBX, so that the terminal can learn, by determining whether the SIB1 carries the scheduling information of the SIBX, whether the cell supports the coverage enhancement mode.

In another case, if an SIB1 sent within a previous first period does not carry the scheduling information of the SIBX, an SIB1 sent within a next period or next few periods carries the scheduling information of the SIBX, and a moment for sending an SIB1 that carries the scheduling information of the SIBX and a moment for sending an SIB1 that does not carry the scheduling information of the SIBX are within a preset time period, the terminal may also consider that the cell supports the coverage enhancement mode.

According to the base station provided in this embodiment of the present invention, a sending module sends, on a first time-frequency resource within at least one first period, first system information that includes coverage enhancement mode indication information to a terminal, so that the terminal can accurately learn, according to the coverage enhancement mode indication information, whether a cell supports communication in a coverage enhancement mode, and the terminal is notified in a timely manner when the cell does not support communication in the coverage enhancement mode, which avoids blind access of the terminal and reduces power consumption of the terminal.

Based on the foregoing Embodiment 1, as another feasible implementation manner of this embodiment of the present invention, this embodiment involves a process in which when the system information is second system information, the sending module 20 sends the system information to the terminal. The second system information may be system information sent according to the enhanced sending manner, that is, a duplicate of ordinary system information sent on an extra resource within a system information sending period. In this embodiment, the second system information may be enhanced first system information. Further, the foregoing sending module 20 is specifically configured to send, on a second time-frequency resource within at least one second period, the second system information to the terminal, so that the terminal learns, according to the second system information, that the cell covered by the base station supports coverage enhancement.

Specifically, the second period may be the same as the foregoing first period, and a quantity of the second period and a quantity of the first period may be the same, or may be different. The second period may be a period for sending enhanced system information, which may be a period (40 ms) for sending an enhanced MIB, or may be a period for sending an enhanced SIB. The enhanced system information herein may be a duplicate of first system information sent on an extra time-frequency resource within a period for sending the first system information. For example, the enhanced MIB may be the MIB sent on the last three OFDM symbols of the first timeslot and the fifth OFDM symbol of the second timeslot in the foregoing embodiment. The second time-frequency resource within the second period may be actually the last three OFDM symbols of the first timeslot and the fifth OFDM symbol of the second timeslot.

Because a second time-frequency resource used when the sending module 20 sends the second system information has a corresponding resource mapping on a terminal side, the terminal may know which resources are used by the sending module 20 as the second time-frequency resource for sending the second system information. Therefore, as long as the sending module 20 sends the second system information to the terminal, the terminal can learn, according to the resource mapping on the terminal side, that the system information is enhanced system information, which indicates that the cell covered by the base station supports coverage enhancement.

Further, a time interval between two consecutive times of sending the second system information by the foregoing sending module 20 is not greater than a first preset time period.

For one or more second periods used by the foregoing sending module 20 for sending the second system information, actually, the sending module 20 does not send the second system information within each second period (the second period for sending the second system information may be negotiated by the base station and the terminal, or may be determined by the base station). The sending module 20 may send the second system information at a moment T1 and send the second system information again at a moment T2, and starting from the moment T2, an interval of sending a next piece of the second system information by the base station is not greater than the first preset time period, where the first preset time period may be explicitly specified in a protocol, for example, a time of 10 radio frames or a time of 10 PBCH periods.

According to the base station provided in this embodiment of the present invention, a sending module sends, on a second time-frequency resource within at least one second period, second system information to a terminal, so that the terminal can accurately learn, according to the second system information, whether a cell supports communication in a coverage enhancement mode, and the terminal is notified in a timely manner when the cell does not support communication in the coverage enhancement mode, which avoids blind access of the terminal and reduces power consumption of the terminal.

Figure 2:
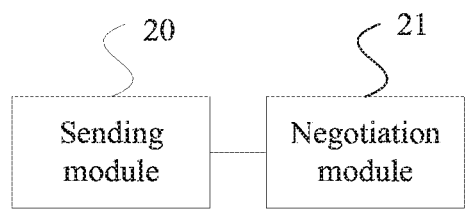
FIG. 2 is a schematic structural diagram of Embodiment 4 of a base station according to the present invention.

FIG. 2 is a schematic structural diagram of Embodiment 4 of a base station according to the present invention. Second system information involved in this embodiment is an enhanced SIB. Based on the foregoing Embodiment 3, further, the base station further includes: a negotiation module 21, configured to: before the foregoing sending module 20 sends the second system information to the terminal, negotiate with the terminal about at least one second period for sending the second system information.

Specifically, the negotiation module 21 negotiates with the terminal about a second period for sending the enhanced SIB by the sending module 20, that is, the negotiation module 21 negotiates about a second period within which the enhanced SIB is sent and a second period within which the enhanced SIB is not sent. After the negotiation module 21 determines the second period for sending the enhanced SIB, the sending module 20 sends, on a second time-frequency resource within the second period, the enhanced SIB.

It should be noted that the enhanced SIB may refer to a normal SIB defined to be repeatedly sent on a second time-frequency resource, and content in each SIB sent on a second time-frequency resource within a second period is the same, for example, each SIB includes resource configuration information required in a coverage enhancement mode (that is, includes scheduling information of an SIBX); or the enhanced SIB may refer to an SIB that carries scheduling information of an SIBX and that is sent only within the determined second period for sending the enhanced SIB, but an SIB sent within another second period does not include the scheduling information of the SIBX.

According to the base station provided in this embodiment of the present invention, a negotiation module negotiates with a terminal about a second period for sending an enhanced SIB, and a sending module sends, on a second time-frequency resource within the negotiated second period, the enhanced SIB to the terminal, so that the terminal can accurately learn, according to the enhanced SIB, whether a cell supports communication in a coverage enhancement mode, and the terminal is notified in a timely manner when the cell does not support communication in the coverage enhancement mode, which avoids blind access of the terminal and reduces power consumption of the terminal.

In the foregoing embodiment, system information sent by a sending module to a terminal is used for indicating whether a cell covered by a base station supports coverage enhancement. However, in an actual communication process, it generally occurs that the cell covered by the base station supports coverage enhancement, but a coverage enhancement status of the cell is off at a moment, which may easily cause: in a case in which the terminal learns that the cell covered by the base station supports coverage enhancement, the terminal continuously makes an access attempt, so that power consumption of the terminal increases. Therefore, in order to avoid this case, in the following embodiment, whether the current coverage enhancement status of the cell is on or off is further indicated to the terminal in a case in which the cell supports coverage enhancement. For better description and understanding of this embodiment, that the system information is an SIB is used as an example in the following embodiment.

Based on the foregoing embodiment, as a feasible implementation manner of this embodiment of the present invention, this embodiment involves a process in which the sending module 20 indicates a current coverage enhancement status of the cell to the terminal by sending a first paging message to the terminal. The foregoing sending module 20 is further configured to send the first paging message to the terminal, where the first paging message includes coverage enhancement status indication information, which is used for indicating the current coverage enhancement status of the cell covered by the base station to the terminal.

Specifically, the terminal obtains an SFN by detecting a PBCH, where the PBCH herein may be a normal PBCH (a PBCH used for sending according to a sending manner specified in a standard), or may be an enhanced PBCH (a PBCH used for sending according to an enhanced manner). The base station and the terminal may predefine, according to the obtained SFN, a period for enhanced sending (for example, for occurrence of the predefined period for enhanced sending, a location of the period for enhanced sending may be obtained in a manner of SFN mod 12=0), that is, the foregoing second period for sending an enhanced SIB. If obtaining the SFN by detecting normal PBCH sending, the UE may learn, by checking coverage enhancement mode indication information included in an SIB1, whether the cell supports the coverage enhancement mode.

When the terminal learns, according to the enhanced SIB or the coverage enhancement indication information in the SIB, that the cell supports coverage enhancement, the terminal may further learn, by using the first paging message that carries the coverage enhancement status indication information and is sent by the sending module 20, whether the current coverage enhancement status of the cell is on or off, that is, the terminal can clearly know the current coverage enhancement status of the cell, so that in a case in which the current coverage enhancement status of the cell is off, the terminal does not continuously attempt to access the cell, which reduces power consumption of the terminal.

According to the base station provided in this embodiment of the present invention, a sending module sends system information to a terminal, so that the terminal learns, according to the system information, a coverage enhancement mode support status of a cell covered by the base station; in addition, the sending module sends, to the terminal, a first paging message carrying coverage enhancement status indication information, so that the terminal learns a current coverage enhancement status of the cell according to the coverage enhancement indication information, which avoids blind access of the terminal in a case in which the current coverage enhancement status of the cell is off, and further reduces power consumption of the terminal.

Based on the foregoing embodiment, as another feasible implementation manner of this embodiment of the present invention, this embodiment involves a process in which the sending module 20 indicates, by sending a second paging message to the terminal, to the terminal that a coverage enhancement status of the cell changes and/or a radio resource public information parameter in the coverage enhancement mode changes, so that the terminal re-acquires new system information. Further, if a current coverage enhancement status of the cell covered by the base station changes and/or the radio resource public information parameter in the system coverage enhancement mode changes, the foregoing sending module 20 is further configured to send the second paging message to the terminal, where the second paging message is used for indicating to the terminal that the current coverage enhancement status of the cell covered by the base station changes and/or the radio resource public information parameter in the system coverage enhancement mode changes, so that the terminal re-acquires the new system information and learns, according to the new system information, a changed coverage enhancement status of the cell and/or a changed radio resource public information parameter in the system coverage enhancement mode.

Specifically, the terminal obtains an SFN by detecting a PBCH, where the PBCH herein may be a normal PBCH (a PBCH used for sending according to a sending manner specified in a standard), or may be an enhanced PBCH (a PBCH used for sending according to an enhanced manner). The base station and the terminal may predefine, according to the obtained SFN, a period for enhanced sending, that is, the foregoing second period for sending an enhanced SIB. If obtaining the SFN by detecting normal PBCH sending, the terminal may learn, by checking coverage enhancement mode indication information included in an SIB1, whether the cell supports the coverage enhancement mode.

When the terminal learns, according to the enhanced SIB or the coverage enhancement indication information in the SIB, that the cell supports coverage enhancement, the terminal may further learn, according to the coverage enhancement status indication information included in the system information sent by the sending module 20, whether the current coverage enhancement status of the cell is on or off, that is, the terminal can clearly know the current coverage enhancement status of the cell, so that in a case in which the current coverage enhancement status of the cell is off, the terminal does not continuously attempt to access the cell, which reduces power consumption of the terminal.

On the other hand, if the foregoing sending module 20 sends the enhanced SIB, and therefore the terminal learns that the cell supports the coverage enhancement mode, there may be multiple situations of a manner for sending the enhanced SIB, which are respectively:

A first situation: the sending module 20 obtains, by calculation according to a rule predefined by the base station and the terminal, for example, according to an SFN, a location of a period for sending the enhanced SIB (a definition of the enhanced SIB herein is described above). For example, sending of the enhanced SIB needs to be completed within a time period starting from a radio frame whose SFN=0, that is, the predefined rule herein only predefines a time period for sending the enhanced SIB. Further, the sending module 20 sends, on a specific time-frequency resource that is within the time period for sending the enhanced SIB and is defined by the base station and the terminal, the enhanced SIB; in addition, coverage enhancement status indication information carried in an SIB1 in the enhanced SIB may be indicated according to a current actual situation of the cell. In addition, in a time except the predefined time period for sending the enhanced SIB, when the sending module 20 may send a normal SIB, scheduling information of an SIBX may not be included.

A second situation: when the sending module 20 sends the enhanced SIB at a predefined time-frequency resource location, when a status indicated by coverage enhancement status indication information in an SIB1 is off, an SIBX including radio resource public information in the coverage enhancement mode in the SIB1 may not be scheduled, that is, the coverage enhancement mode indication information may not be carried in the SIB1.

A third situation: an extension field of the SIB may include scheduling information of an SIBX, or may not include scheduling information of an SIBX, or when a coverage enhancement status that is of the cell and is indicated by coverage enhancement status indication information in an SIB1 or a radio resource public information parameter in an enhancement mode changes, the second paging message may not be sent to notify ordinary UE. However, when the coverage enhancement status of the cell or the radio resource public information parameter in the enhancement mode changes, the second paging message needs to be sent to notify a terminal that needs coverage enhancement of the change. The second paging message may indicate to the terminal that a current coverage enhancement status of the cell covered by the base station changes and/or the radio resource public information parameter in the system coverage enhancement mode changes, so that the terminal can re-acquire new system information, and learn, according to a coverage enhancement status and a radio resource public information parameter in the enhancement mode that are in the new system information, a changed coverage enhancement status of the cell and/or a changed radio resource public information parameter in the enhancement mode.

A fourth situation: if the base station and the terminal predefine relatively many time-frequency resources, in order to improve resource efficiency, actually, the sending module 20 may not send the enhanced SIB on each predefined time-frequency resource. As long as the terminal does not detect the enhanced SIB, the terminal may attempt to perform detection again at a next predefined time-frequency resource location. In addition, when learning, according to the coverage enhancement status indication information, that a current coverage enhancement status of the cell is on, the terminal considers that the cell has currently been working in the coverage enhancement mode, and may start communication with the base station according to radio resource configuration in the enhancement mode in the SIB; when a CEM status detected by the terminal is off, the UE determines, according to an actual requirement, a time for detecting whether the coverage enhancement status of the cell indicated by the coverage enhancement status indication information in the SIB turns to on.

According to the base station provided in this embodiment of the present invention, a sending module sends, to a terminal, system information including coverage enhancement status indication information and a radio resource public information parameter in a coverage enhancement mode, so that the terminal learns, according to the system information, a coverage enhancement mode support status of a cell covered by the base station and learns, in a case in which the cell supports the coverage enhancement mode, whether a current coverage enhancement status of the cell is on or off, which avoids blind access of the terminal in a case in which the current coverage enhancement status of the cell is off, and further reduces power consumption of the terminal; in addition, when the coverage enhancement status of the cell changes, the sending module sends a second paging message to the terminal, so that the terminal can re-acquire new system information and learn, according to the new system information, a changed coverage enhancement status of the cell and/or a changed radio resource public information parameter in the system coverage enhancement mode, so that the terminal can better perform communication with the base station.

Based on the foregoing embodiment, as a third feasible implementation manner of this embodiment of the present invention, this embodiment involves a process in which the sending module 20 indicates, by sending a third paging message to the terminal, to the terminal that a coverage enhancement status of the cell changes, so that the terminal learns, according to the third paging message, a changed coverage enhancement status of the cell. Further, the foregoing system information includes coverage enhancement status indication information and a radio resource public information parameter in the coverage enhancement mode, and if a current coverage enhancement status of the cell covered by the base station changes, the foregoing sending module 20 is further configured to send the third paging message to the terminal, where the third paging message carries the coverage enhancement status indication information, so that the terminal learns, according to the coverage enhancement status indication information in the third paging message, the changed coverage enhancement status of the cell covered by the base station.

Specifically, the terminal obtains an SFN by detecting a PBCH, where the PBCH herein may be a normal PBCH (a PBCH used for sending according to a sending manner specified in a standard), or may be an enhanced PBCH (a PBCH used for sending according to an enhanced manner). The base station and the terminal may predefine, according to the obtained SFN, a period for enhanced sending, that is, the foregoing second period for sending an enhanced SIB. If obtaining the SFN by detecting normal PBCH sending, the terminal may learn, by checking coverage enhancement mode indication information included in an SIB1, whether the cell supports the coverage enhancement mode.

When the terminal learns, according to the enhanced SIB or the coverage enhancement indication information in the SIB, that the cell supports coverage enhancement, the terminal may further learn, according to the coverage enhancement status indication information included in the system information sent by the sending module 20, whether the current coverage enhancement status of the cell is on or off, that is, the terminal can clearly know the current coverage enhancement status of the cell, so that in a case in which the current coverage enhancement status of the cell is off, the terminal does not continuously attempt to access the cell, which reduces power consumption of the terminal.

When working in a coverage enhancement state, the terminal may not need to periodically detect the third paging message. When the terminal works abnormally, that is, when the coverage enhancement status of the cell changes, the sending module 20 sends the third paging message to the terminal, where the third paging message carries the coverage enhancement status indication information, so that the terminal can learn, according to the coverage enhancement status indication information in the third paging message, the changed coverage enhancement status of the cell, that is, the terminal does not need to acquire new system information again to learn the changed coverage enhancement status of the cell. In addition, because it is easier for the terminal to detect the third paging message than to detect the system information, power consumption of the terminal is further reduced.

According to the base station provided in this embodiment of the present invention, a sending module sends, to a terminal, system information including coverage enhancement status indication information and a radio resource public information parameter in a coverage enhancement mode, so that the terminal learns, according to the system information, a coverage enhancement mode support status of a cell covered by the base station and learns, in a case in which the cell supports the coverage enhancement mode, whether a current coverage enhancement status of the cell is on or off, which avoids blind access of the terminal in a case in which the current coverage enhancement status of the cell is off, and further reduces power consumption of the terminal; in addition, when the coverage enhancement status of the cell changes, the sending module sends a third paging message to the terminal, so that the terminal can learn again, according to coverage enhancement status indication information in the third paging message, a changed coverage enhancement status of the cell, so that the terminal can better perform communication with the base station, and the power consumption of the terminal is further reduced.

Based on the foregoing embodiment, as a fourth possible implementation manner of this embodiment of the present invention, this embodiment involves a specific process in which when the system information includes a quantity of resources used in the coverage enhancement mode and a maximum quantity of access times of attempting, by the terminal, to access the cell covered by the base station, the terminal learns, according to the system information, a current coverage enhancement status of the cell covered the base station.

Specifically, the sending module 20 sends the system information to the terminal, where the system information includes the quantity of resources used in the coverage enhancement mode and the maximum quantity of access times of attempting, by the terminal, to access the cell covered by the base station, and the base station may further adjust, by configuring the quantity of resources in the coverage enhancement mode, a quantity of terminals with access coverage enhancement in a network, for example, density of time-frequency resources of a PRACH may be adjusted. Optionally, the system information may be sent within at least one first period, or may be sent within at least one second period, or may be sent selectively within at least one first period or second period, where the selective sending herein refers choosing not to send within some first periods or second periods. When the terminal always cannot succeed in accessing a network by using the PRACH, and after a maximum quantity of access attempt times that is configured by the base station is reached, the terminal considers that the base station may not be able to fully support the coverage enhancement mode in this case, that is, the terminal learns that the current coverage enhancement status of the cell covered by the base station is off. Therefore, the terminal may make an access attempt again after waiting for a random time period, instead of reporting an error to a high layer.

According to the base station provided in this embodiment of the present invention, a sending module sends system information to a terminal, so that the terminal learns, according to the system information, whether a cell covered by the base station supports a coverage enhancement mode; the terminal attempts, by using a quantity of resources used in the coverage enhancement mode and a maximum quantity of access times of attempting, by the terminal, to access the cell covered by the base station that are included in the system information, to access the cell covered by the base station, and after the maximum quantity of access times is reached, the terminal still cannot access the cell and then determines that a current coverage enhancement status of the cell is off, and therefore the terminal chooses to access again after a time period, which avoids continuous and blind access of the terminal in a case in which the current coverage enhancement status of the cell is off, and reduces power consumption of the terminal.

Embodiment 1 of the present invention provides a method for indicating a cell coverage enhancement mode. The method may be executed by a base station in the foregoing embodiment. The method includes the following steps:

S101: The base station sends system information to a terminal, where the system information is used for indicating to the terminal whether a cell covered by the base station supports coverage enhancement, and the system information includes a master information block MIB and/or a system information block SIB.

For this embodiment of the method for indicating a cell coverage enhancement mode provided in the present invention, reference may be made to an execution process of the foregoing base station embodiment, and implementation principles and technical effects thereof are similar. Details are not described herein again.

Optionally, if the system information is first system information, and the first system information includes coverage enhancement mode indication information, where the coverage enhancement mode indication information is used for indicating to the terminal whether the cell covered by the base station supports coverage enhancement, the foregoing S101 is specifically: sending, by the base station on a first time-frequency resource within at least one first period, the first system information to the terminal, so that the terminal learns, according to the coverage enhancement mode indication information, whether the cell covered by the base station supports coverage enhancement.

Further, if the first system information is the SIB, the coverage enhancement mode indication information is an indicator bit in the SIB or scheduling information of an SIBX, where the SIBX is a public radio resource configuration information block in a coverage enhancement mode.

For this embodiment of the method for indicating a cell coverage enhancement mode provided in the present invention, reference may be made to an execution process of the foregoing base station embodiment, and implementation principles and technical effects thereof are similar. Details are not described herein again.

Optionally, if the system information is second system information, the foregoing S101 may be specifically: sending, by the base station on a second time-frequency resource within at least one second period, the second system information to the terminal, so that the terminal learns, according to the second system information, that the cell covered by the base station supports coverage enhancement.

Figure 3:
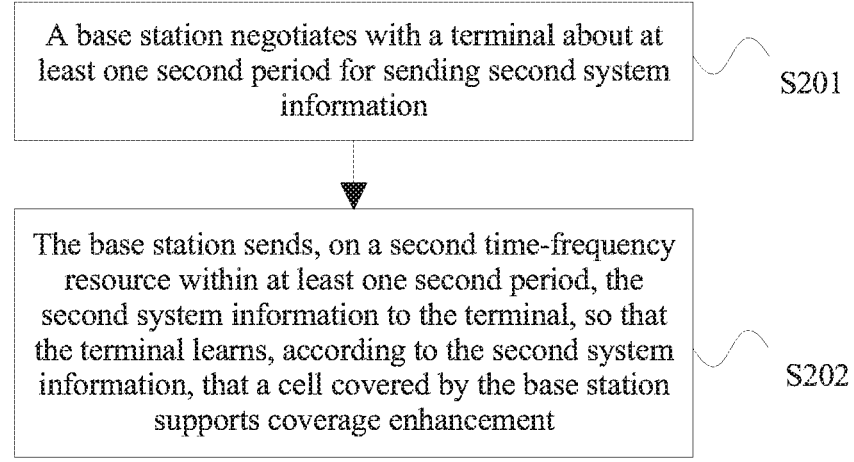
FIG. 3 is a flowchart of Embodiment 2 of a method for indicating a cell coverage enhancement mode according to the present invention.

FIG. 3 is a flowchart of Embodiment 2 of a method for indicating a cell coverage enhancement mode according to the present invention. The method includes the following steps:

S201: A base station negotiates with a terminal about at least one second period for sending second system information.

S202: The base station sends, on a second time-frequency resource within at least one second period, the second system information to the terminal, so that the terminal learns, according to the second system information, that a cell covered by the base station supports coverage enhancement.

For this embodiment of the method for indicating a cell coverage enhancement mode provided in the present invention, reference may be made to an execution process of the foregoing base station embodiment, and implementation principles and technical effects thereof are similar. Details are not described herein again.

Optionally, based on the foregoing method embodiment, the method may further include: sending, by the base station, a first paging message to the terminal, where the first paging message includes coverage enhancement status indication information, which is used for indicating a current coverage enhancement status of the cell covered by the base station to the terminal.

Optionally, based on the foregoing method embodiment, the system information includes coverage enhancement status indication information and a radio resource public information parameter in a coverage enhancement mode, and if a current coverage enhancement status of the cell covered by the base station changes and/or the radio resource public information parameter in the system coverage enhancement mode changes, the method may further include: sending, by the base station, a second paging message to the terminal, where the second paging message is used for indicating to the terminal that the current coverage enhancement status of the cell covered by the base station changes and/or the radio resource public information parameter in the system coverage enhancement mode changes, so that the terminal re-acquires new system information and learns, according to the new system information, a changed coverage enhancement status of the cell covered by the base station and/or a changed radio resource public information parameter in the system coverage enhancement mode.

Optionally, based on the foregoing method embodiment, the system information includes coverage enhancement status indication information and a radio resource public information parameter in a coverage enhancement mode, and if a current coverage enhancement status of the cell covered by the base station changes, the method may further include: sending, by the base station, a third paging message to the terminal, where the third paging message carries the coverage enhancement status indication information, so that the terminal learns, according to the coverage enhancement status indication information in the third paging message, a changed coverage enhancement status of the cell covered by the base station.

Optionally, based on the foregoing method embodiment, the system information includes a quantity of resources used in a coverage enhancement mode and a maximum quantity of access times of attempting, by the terminal, to access the cell covered by the base station, so that the terminal determines, according to whether a quantity of times of accessing the cell covered by the base station reaches the maximum quantity of access times, a current coverage enhancement status of the cell covered by the base station.

For this embodiment of the method for indicating a cell coverage enhancement mode provided in the present invention, reference may be made to an execution process of the foregoing base station embodiment, and implementation principles and technical effects thereof are similar. Details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A base station comprising:
a transmitter configured to send system information to a terminal, wherein the system information is used for indicating to the terminal whether a cell covered by the base station supports a coverage enhancement mode, and wherein the system information comprises a master information block (MIB) and/or a system information block (SIB); and
a processor configured to determine that the cell supports the coverage enhancement mode when the system information comprises scheduling information of a SIBX.

2. The base station according to claim 1, wherein the transmitter is further configured to send, on a first time-frequency resource within at least one first period, the system information to the terminal.

3. The base station according to claim 2, wherein a time interval between two consecutive times of sending the system information by the transmitter is not greater than a first preset time period.

4. The base station according to claim 1, wherein the transmitter is further configured to send a first paging message to the terminal, wherein the first paging message comprises coverage enhancement status indication information, which is used for indicating a current coverage enhancement status of the cell covered by the base station to the terminal.

5. The base station according to claim 1, wherein the system information comprises coverage enhancement status indication information and a radio resource public information parameter in a coverage enhancement mode, and if a current coverage enhancement status of the cell covered by the base station changes and/or the radio resource public information parameter in the system coverage enhancement mode changes, the transmitter is further configured to send a second paging message to the terminal, wherein the second paging message is used for indicating to the terminal that the current coverage enhancement status of the cell covered by the base station changes and/or the radio resource public information parameter in the system coverage enhancement mode changes so that the terminal re-acquires new system information and learns, according to the new system information, a changed coverage enhancement status of the cell covered by the base station and/or a changed radio resource public information parameter in the coverage enhancement mode.

6. The base station according to claim 1, wherein the system information comprises a quantity of resources used in a coverage enhancement mode and a maximum quantity of access times of attempting, by the terminal, to access the cell covered by the base station so that the terminal determines, according to whether the quantity of times of accessing the cell covered by the base station reaches the maximum quantity of access times, a current coverage enhancement status of the cell covered by the base station.

7. A method for indicating a cell coverage enhancement mode, the method comprising:
sending, by a base station, system information to a terminal, wherein the system information is used for indicating to the terminal whether a cell covered by the base station supports a coverage enhancement mode, and wherein the system information comprises a master information block (MIB) and/or a system information block (SIB); and
determining, by the base station, that the cell supports the coverage enhancement mode when the system information comprises scheduling information of a SIBX.

8. The method according to claim 7, wherein sending, by the base station, system information to the terminal comprises sending, by the base station, system information on a first time-frequency resource within at least one first period.

9. The method according to claim 8, wherein sending a time interval between two consecutive times of sending the system information by the base station is not greater than a first preset time period.

10. The method according to claim 7, wherein the method further comprises sending, by the base station, a first paging message to the terminal, wherein the first paging message comprises coverage enhancement status indication information which is used for indicating a current coverage enhancement status of the cell covered by the base station to the terminal.

11. The method according to claim 7, wherein the system information comprises coverage enhancement status indication information and a radio resource public information parameter in the coverage enhancement mode, and if a current coverage enhancement status of the cell covered by the base station changes and/or the radio resource public information parameter in the system coverage enhancement mode changes, the method further comprises sending, by the base station, a second paging message to the terminal, wherein the second paging message is used for indicating to the terminal that the current coverage enhancement status of the cell covered by the base station changes and/or the radio resource public information parameter in the system coverage enhancement mode changes so that the terminal re-acquires new system information and learns, according to the new system information, a changed coverage enhancement status of the cell covered by the base station and/or a changed radio resource public information parameter in the coverage enhancement mode.

12. The method according to claim 7, wherein the system information comprises a quantity of resources used in a coverage enhancement mode and a maximum quantity of access times of attempting, by the terminal, to access the cell covered by the base station so that the terminal determines, according to whether a quantity of times of accessing the cell covered by the base station reaches the maximum quantity of access times, a current coverage enhancement status of the cell covered by the base station.

* * * * *